United States Patent [19]

Proulx

[11] Patent Number: 5,176,828
[45] Date of Patent: Jan. 5, 1993

[54] MANIFOLD SEGMENT STACK WITH INTERMEDIATE FEED MANIFOLD

[75] Inventor: Andrew Proulx, Westford, Mass.

[73] Assignee: Millipore Corporation, Bedford, Mass.

[21] Appl. No.: 770,796

[22] Filed: Oct. 3, 1991

Related U.S. Application Data

[63] Continuation-in-part of Ser. No. 650,251, Feb. 4, 1991, Pat. No. 5,147,572.

[51] Int. Cl.⁵ .............................................. B01D 24/00
[52] U.S. Cl. ................................. 210/341; 210/340; 210/346; 210/456; 210/321.75
[58] Field of Search ............... 210/346, 433.1, 321.64, 210/321.75, 321.84, 347, 488, 489, 247, 340, 456, 341

[56] References Cited

U.S. PATENT DOCUMENTS

| | | | |
|---|---|---|---|
| 4,110,220 | 8/1978 | Lavender | 210/456 |
| 4,212,742 | 7/1980 | Solomon et al. | 210/346 |
| 4,261,834 | 4/1981 | deWinter | 210/321.64 |
| 4,597,868 | 7/1986 | Watanabe | 210/347 |
| 4,601,824 | 7/1986 | Dreyer | 210/456 |
| 4,715,955 | 12/1987 | Friedman | 210/346 |
| 4,849,102 | 7/1989 | Latour et al. | 210/321.64 |
| 5,015,388 | 5/1991 | Pusineri et al. | 210/321.64 |
| 5,069,789 | 12/1991 | Mohn et al. | 210/346 |

Primary Examiner—Robert A. Dawson
Assistant Examiner—Ana M. Fortuna
Attorney, Agent, or Firm—Andrew T. Karnakis; Paul J. Cook

[57] ABSTRACT

A tangential flow filtration apparatus which utilizes a single manifold formed of a stack of manifold segments to introduce liquid to be filtered into the apparatus and to remove a filtrate stream and a retentate stream from the apparatus is provided. A plurality of filtration modules are stacked between the manifold and a plate. Holes and sealing means are provided within the filtration modules to effect flow of the filtrate, retentate and feed liquid through the stack and manifold while preventing admixture of the filtrate with the retentate or the feed liquid. A feed manifold is positioned at an intermediate position within the stack of manifold segments. All manifold segments with the exception of the most downstream manifold segment or most upstream manifold segment from the point of introducing incoming liquid must have a filtrate exit from both ends of the manifold segment. The most downstream or the most upstream manifold segment also can have filtrate exits from both of its ends.

11 Claims, 8 Drawing Sheets

MANIFOLD SEGMENT STACK WITH INTERMEDIATE FEED MANIFOLD

REFERENCE TO RELATED APPLICATION

This application is a continuation in part of application Ser. No. 650,251, filed Feb. 4, 1991, now U.S. Pat. No. 5,147,572.

BACKGROUND OF THE INVENTION

This invention relates to a manifold system for a plurality of liquid filtration segments wherein a feed manifold is positioned to promote efficient liquid flow through the system. More particularly, this invention relates to a manifold system including a feed manifold positioned at an intermediate position within a manifold system of a plurality of stacked manifold segments.

Prior to the present invention, liquids, primarily aqueous liquids have been filtered by tangential flow filtration modules wherein a plurality of filters are stacked between two manifolds, one at the bottom of the stack and one at the top of the stack. The filtration module stack comprises a collection of one or more filtration modules and associated intermodule gaskets. The filters are separated by appropriate screens and liquid impervious layers to permit liquid flow, as well as filtrate and retentate flow into and from the stack. In addition, flow holes are provided through the layers within the stack. The holes are sealed appropriately to prevent admixture of filtrate with incoming liquid or retentate. The manifolds in each segment are designed so that the filtrate is removed from both the top and bottom manifolds while incoming liquid is introduced into one manifold and retentate is removed from the second manifold. This manifold arrangement necessitates fittings to both manifolds in order to supply and remove liquid to and from the stacks. This is undesirable since additional manipulative steps for removing and connecting the fittings are required when it is desirable to replace the filtration elements forming the stack. In addition, the use of two manifolds to remove filtrate from the stack undesirably increases the filtrate volume retained within the stack. Furthermore, the requirement of two manifolds is undesirably expensive.

It has been proposed in U.S. Pat. No. 4,849,102 to provide a manifold for a plurality of filtration modules. However, this manifold arrangement is limited since only two filtration modules can be accommodated while avoiding the need for conduits external the manifold. That is, when more than two filtration modules are utilized, external connecting conduits are required.

The manifold system disclosed in U.S. patent application Ser. No. 650,251, filed Feb. 4, 1991 comprises a manifold for a plurality of tangential flow filtration modules which utilizes only one manifold and which accommodates any number of a plurality of filtration modules without the need for conduits external of the manifold. This arrangement reduces the number of sealed fittings and reduces the required apparatus volume for processing a given volume of liquid as compared to the prior art systems. In this manifold system, the feed is introduced at one end of the stack so that the size of the feed is limited by and must be compatible with the size of the fixed liquid flow path within the manifold.

SUMMARY OF THE INVENTION

In accordance with this invention, a manifold apparatus comprising a plurality of manifold segments is provided which can be in fluid communication with any number of a plurality of filtration modules without the need for conduits external of the manifold segments connecting the manifold segments. The manifold apparatus is comprised of a plurality of manifold segments which interconnect with one another to form a stack of manifold segments and wherein a feed inlet manifold is positioned at an intermediate position within the stack of manifold segments. A manifold segment comprises a single piece which holds filtration modules on each side and has internal conduits for the feed, filtrate and retentate. The feed inlet manifold includes a feed inlet conduit having a size larger than the internal feed conduits in the manifold segments. The manifold system is designed so that the initial feed is split to enter two sets of manifold segments on either side of the feed inlet manifold.

All manifold segments with the exception of the most downstream or most upstream manifold segment from the point of introducing incoming liquid must have a filtrate exit from both ends of the manifold segment. The most downstream or the most upstream manifold segment also can have filtrate exits from both of its ends. The feed inlet manifold also can have an internal filtrate conduit. The retentate exit can be in the feed manifold or can comprise retentate exits from the end manifold segments. The filtrate from the filtration modules connected to the manifold segments is collected within the manifold segments and can be recovered from a conduit in the feed manifold or from filtrate exit conduits from one or both ends of the stack of manifold segments. The feed fluid is in fluid communication with retentate within the stacks. The filtration modules are secured to the manifold in a manner so that filtrate is separated and collected without admixing with the feed or the retentate. The feed manifold includes a feed inlet and can include a retentate outlet and/or a filtrate outlet. By utilizing this feed system, an increased rate of feed can be processed for a given internal fluid capacity within the manifold segment as compared to introducing feed at either end of the stack of manifold segments. This is because incoming feed fluid is split to be directed into two sets of manifold segments which are separated by the feed manifold.

DESCRIPTION OF SPECIFIC SEGMENTS

Figure 1:
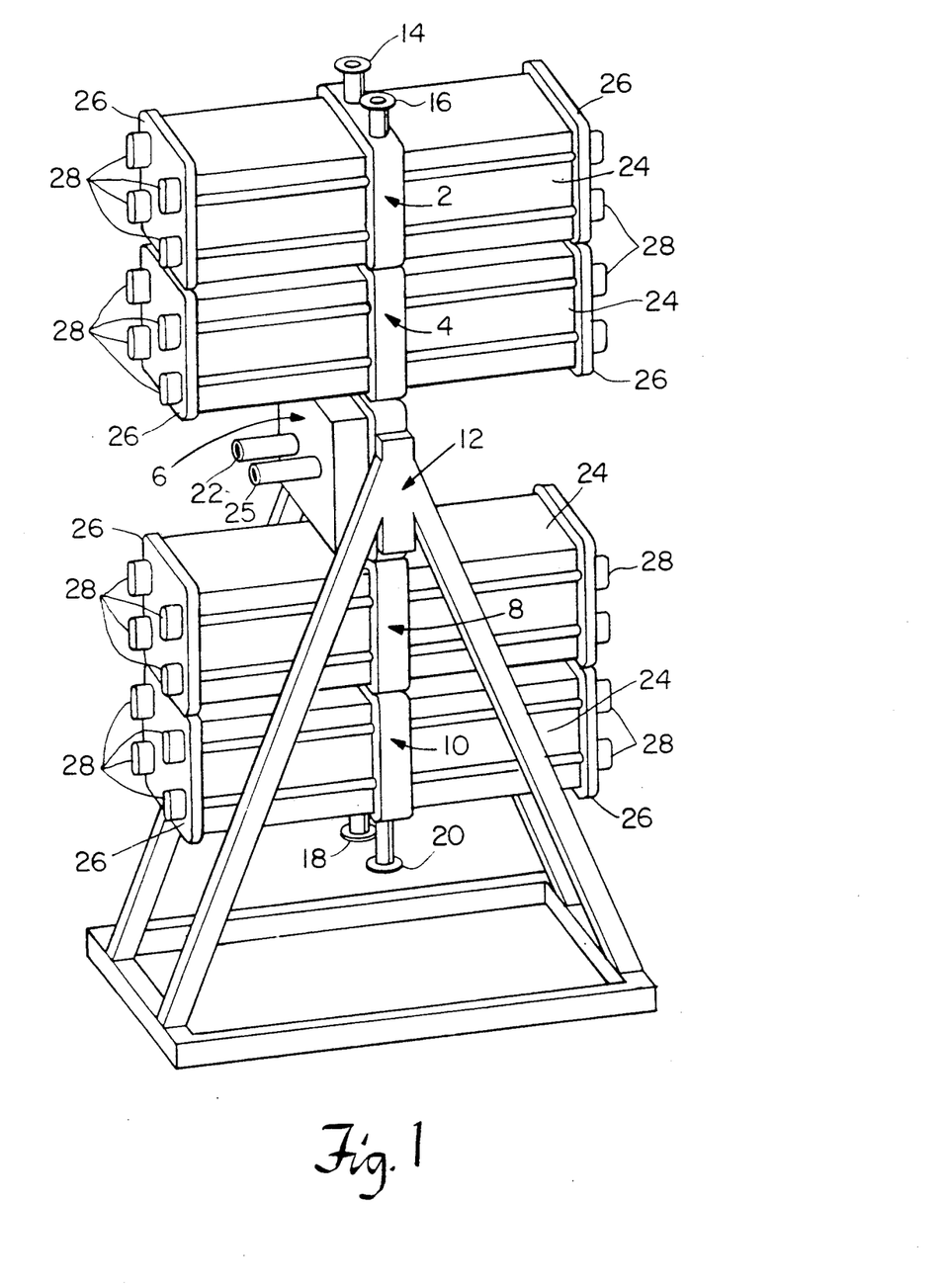
FIG. 1 is an isometric view of the manifold apparatus of this invention in use.

Referring to FIG. 1, the manifold apparatus of this invention includes a first set of manifold segments 2 and 4, connected together, a feed manifold 6 and a second set of manifold segments 8 and 10 connected together and mounted on manifold frame 12. The first set of manifold segments 2 and 4 is provided with a filtrate outlet 14 and a retentate vent 16. The second set of manifold segments 8 and 10 is provided with a filtrate outlet 18 and a retentate drain 20. The retentate drain 20 and retentate vent 16 are capped during filtration. The retentate vent 16 permits filling the retentate flow path with liquid and the retentate drain permits draining the apparatus of retentate upon completion of the filtration. The feed manifold 6 is provided with a feed inlet 22 and a retentate outlet 25. The feed inlet can have a diameter larger than that of internal feed conduits within the manifold segments since the incoming feed is split into the first set of manifold segments 2 and 4 and the second set of manifold segments 8 and 10. A plurality of filtration modules 24 are secured to manifold segments 2, 4, 8 and 10 by means of a plate 26 and a plurality of compression assemblies 28 such as bolts.

Figure 2:
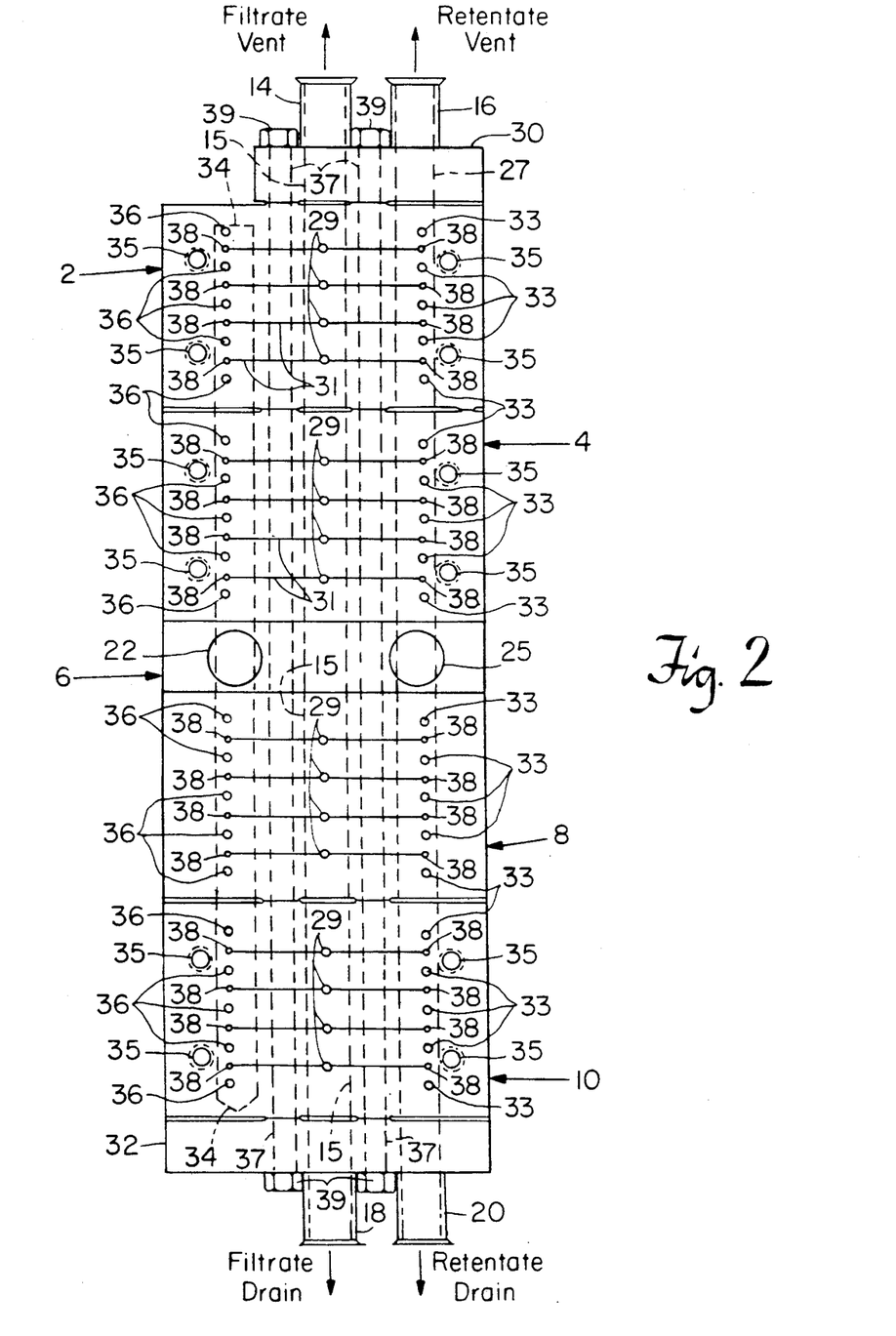
FIG. 2 is a side view of the manifold apparatus of this invention suitable for parallel feed from an intermediate feed manifold to the manifold segments.

Referring to FIG. 2, where like elements to those of FIG. 1 are numbered the same, the gaps between fitting blocks 3 and 32 and manifold segments 2 and 10 as well as between all manifold segments are provided with conventional gasket means to effect desired sealing of filtrate from retentate and feed and sealing of internal conduits from the exterior of the apparatus. A parallel feed and retentate arrangement is shown in FIG. 2. Fluid feed is introduced through inlet 22, internal feed conduit 34 and into filtration modules 24 through fluid feed inlet means 36 comprising a plurality of holes which extend through the thickness of manifold segments 2, 4, 8 and 10. Filtrate is removed from filtration modules 24 through filtrate outlet means 38 positioned on opposite sides of manifold segments 2, 4, 8 and 10, filtrate channels 31, filtrate outlet means 29, internal filtrate conduit 15 and filtrate outlets 14 and 18. Outlet means 38 do not extend through the thickness of manifold segments 2, 4, 8 and 10 while filtrate outlet means 29 extend through the thickness of manifold segments 2, 4, 8 and 10 to fluid communication with filtrate outlets 14 and 18. Filtrate is removed from the manifold through filtrate outlets 14 and 18. The filtrate outlet means 38 and 29 are connected by slots or grooves 31 in manifold segments 2, 4, 8 and 10. Retentate is removed from the filtration modules 24 through retentate outlet means 33 comprising holes in manifold segments 2, 4, 8 and 10, internal retentate conduit 27 and retentate outlet 25. Retentate drain 20 and retentate vent are blocked during filtration and opened when it is desired to drain retentate from the apparatus. Holes 35 are provided in the manifold segments 2, 4, 8 and 10 for bolts or tie rods 28 to secure the filtration modules 24 to the manifold segments 2, 4, 8 and 10. Tie rods 37 and nuts 39 are utilized to secure the manifold segments 2, 4, 8 and 10 and feed manifold 6 together.

Figure 3:
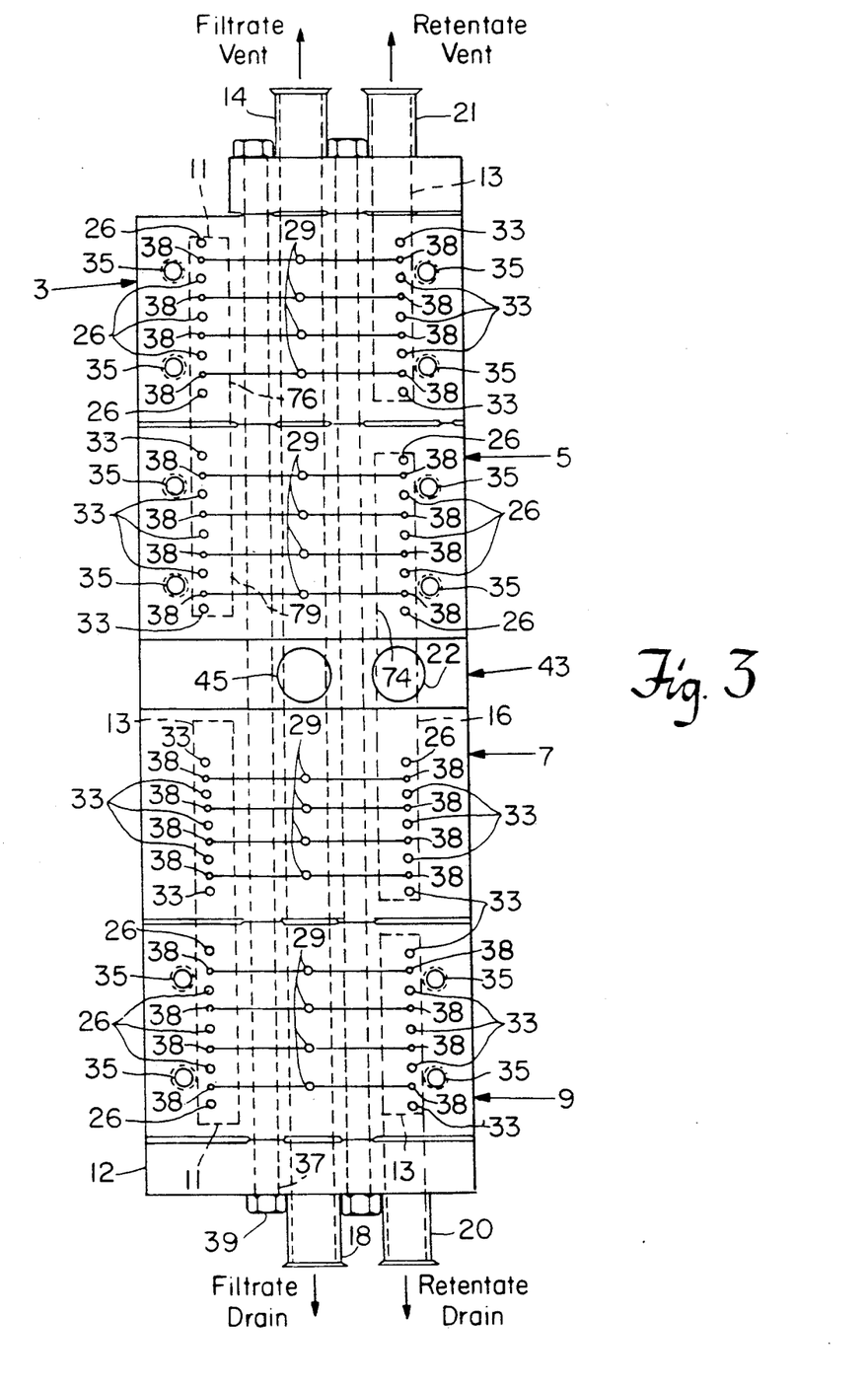
FIG. 3 is a side view of the manifold apparatus of this invention suitable for serial feed from an intermediate feed manifold to the manifold segments.

Referring to FIG. 3, where like elements to those of FIG. 1 and 2 are numbered the same, manifold segments 3, 5, 7 and 9 are similar to the manifold segments 2, 4, 8 and 10 of FIG. 2 except that the internal feed conduit 11 and the internal retentate conduit 13 pass only through a portion of the thickness of manifold segments 3, 5, 7 and 9 thereby to effect a serial flow through the manifold segments rather than a parallel flow and the feed manifold 43 includes a filtrate outlet 45 and a feed inlet 22. As shown in FIG. 3, a portion of the internal retentate conduit, e.g., 74 of manifold segment 5 is connected to a portion of the internal feed conduit, e.g., 76 of an adjacent manifold segment 3 to achieve the serial flow through the manifold segments, 3, 5, 7 and 9 rather than the parallel flow shown in FIG. 2. Retentate is removed through retentate outlets 20 and 21. When utilizing the serial flow arrangement shown in FIG. 3, the retentate must be removed from both ends of the stack of manifold segments. During filtration, filtrate drain 16 and filtrate vent 14 are blocked so that filtrate is removed from filtrate outlet 45.

Figure 4:
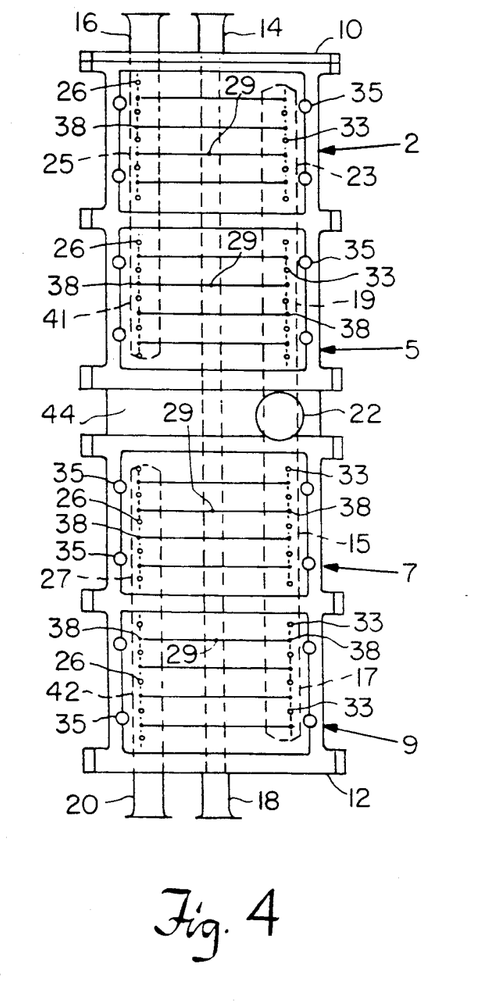
FIG. 4 is a side view of the manifold apparatus of this invention having only a feed inlet in the feed manifold.
Figure 5:
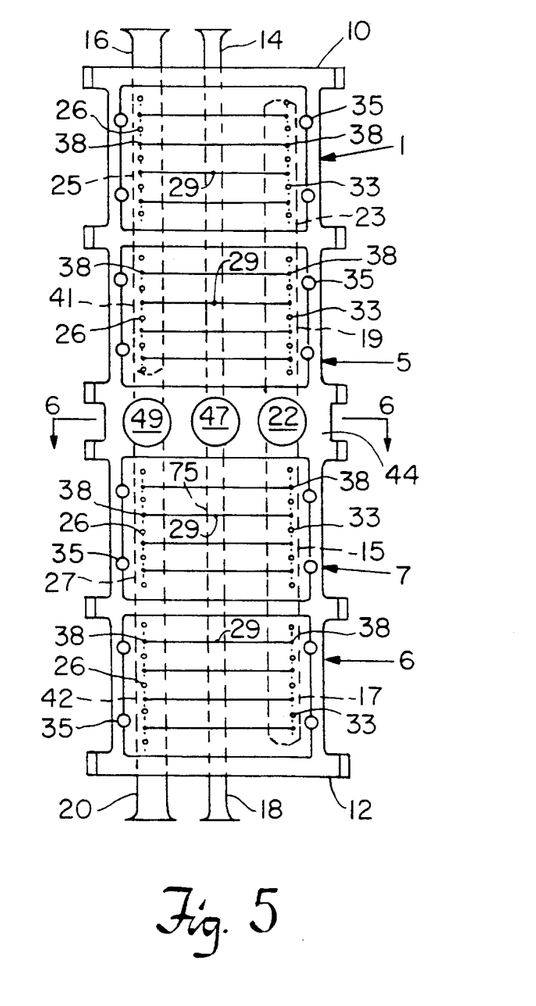
FIG. 5 is a side view of the manifold apparatus of this invention with a feed manifold having a feed inlet, a retentate outlet and a filtrate outlet.

Referring to FIGS. 4 and 5 wherein like elements shown in FIGS. 2 and 3 are represented by the same numeral references, the manifold apparatus utilizes manifold segments to effect parallel flow of feed through the manifold apparatus. Manifold segments 2, 5, 7 and 9 are provided in FIG. 4. Feed enters feed inlet 22 of feed manifold 40 and an attached filtration module such as is shown in FIG. 1 through internal conduits 15, 17, 19 and 23 and fluid inlet means 33. Filtrate is removed from manifold segments 2, 5, 7 and 9 through filtrate outlet means 38 and 29 and filtrate outlets 14 and 18 as described above. Retentate passes from manifold segments 2, 5, 7 and 9 through retentate outlet means 26 and into internal conduits 25, 27, 41 and 42 and out retentate outlets 20 and 21. Thus, feed and retentate pass in parallel flow through manifold segments 2, 5, 7 and 9.

Figure 6:
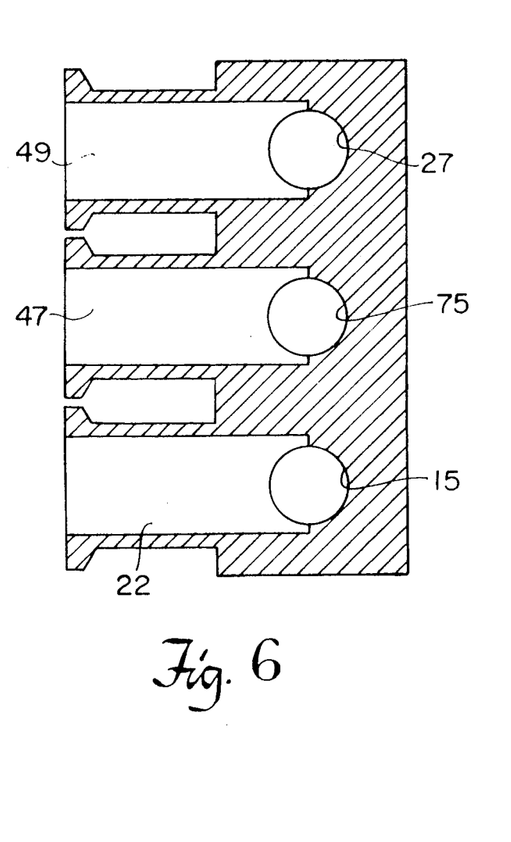
FIG. 6 is a cross-sectional view of the apparatus of FIG. 5 taken along line 6—6.

The arrangement shown in FIGS. 5 and 6 is the same as that shown in FIG. 4 except that the feed module 44 includes a retentate outlet and a filtrate outlet. The feed module 44 includes a feed inlet 22 connected to internal feed conduits 15 and 19, a filtrate outlet 47 connected to internal filtrate conduit 75 and a retentate outlet 49 connected to internal retentate conduits 27 and 41 during filtration, filtrate vent 14, filtrate drain 18, retentate vent 16 and retentate drain 90 are blocked.

The manifold segments utilized in the present invention have either one filtrate outlet or no filtrate outlet on opposing interconnecting or end surfaces. Manifold segments intermediately positioned with the manifold stack have filtrate outlets at one or both opposing ends which interconnect with adjacent manifold segments or the feed manifold.

By utilizing the internal filtrate conduits as shown in the drawings, it is possible to interconnect the manifold segments and feed manifold with internal conduits while avoiding the need for external conduits to effect this interconnection.

Figure 7:
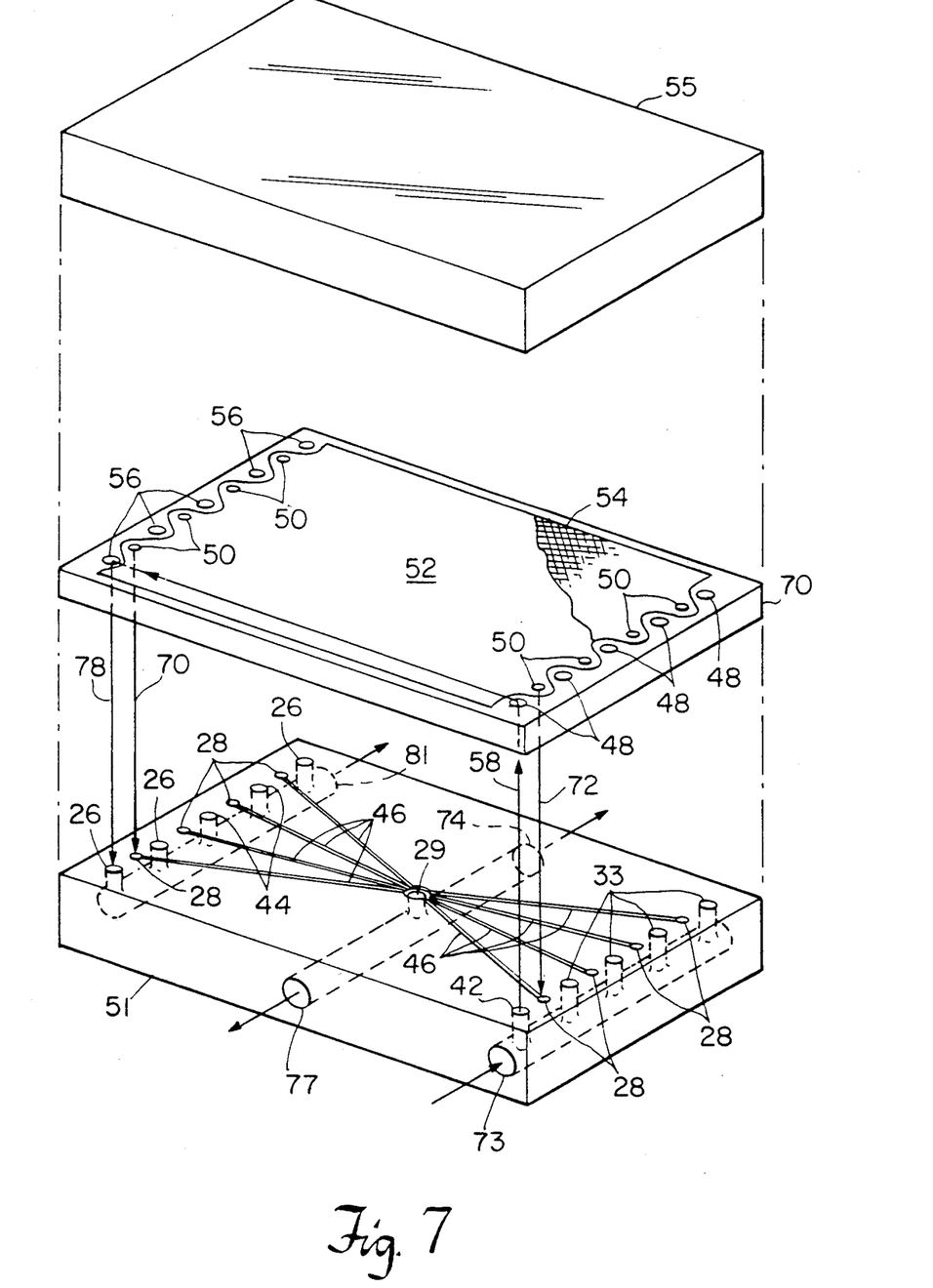
FIG. 7 is an exploded view of a filtration module suitable for use with this invention.
Figure 8:
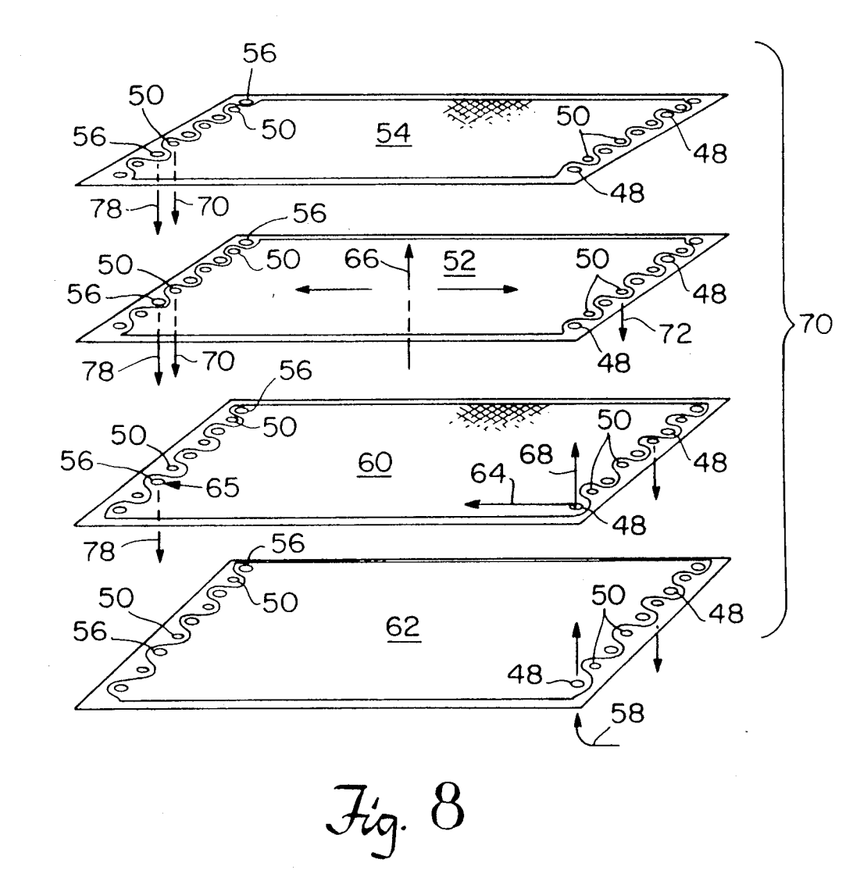
FIG. 8 illustrates the function of a filtration module suitable for use with this invention.

Referring to FIG. 7, a filtration module useful with the manifold of this invention is described. A filtration element 70 is positioned between manifold segment 51 and plate 55. Manifold 51 is provided with liquid inlet 73, filtrate outlets 77 and 79 and retentate outlet 81. The manifold segment 51 includes a plurality of feed inlet means 33 and a plurality of retentate outlet means 26. One set of filtrate outlet means 28 is provided on one end of the manifold segment 51 while a second set of filtrate outlet means 28 is provided on the opposite end of manifold segment 51. The filtrate outlet means 28 are connected to filtrate outlets 77 and 79 by filtrate conduit paths (grooves) 46 and centrally located filtrate outlet means 29. The paths 46 are of a size which permits filtrate to flow therethrough while avoiding sagging of a filtrate screen (not shown) into the paths 46, typically about 0.6 to 0.12 inch wide. The filtration module 70 includes holes 48 which communicate with feed inlet means 33 and holes 50 which communicate with filtrate outlet means 28. As seen in FIG. 8, the filtrate side 52 of the filter layer 53 having mesh spacer 54 in contact therewith is exposed. The filtration segment 70 is also provided with holes 56 which communicate with retentate outlet means 26. The plate 55 serves as a seal for the top surface of the filtration module 70.

Referring to FIG. 8, the filtration module 70 includes a filtrate spacer 54, a filter layer 52, a retentate spacer 60 and a filter layer 62 with a second filtrate spacer 54 (not shown) and which can contact paths 46. The liquid feed represented by arrow 58 passes through holes 48 in layer 62 into spacer 60. A portion of the liquid passes through spacer 60, as represented by arrow 64 and through filter 52 as represented by arrow 66. The remaining portion of the incoming liquid passes upwardly as represented by arrow 68, through holes 48 in filter 52, holes 48 in filtrate spacer 54 and into the next adjacent filtration module (not shown) wherein it proceeds as described above with reference to filtration module 70. The filtrate passes into holes 50 and passes in a direction as shown by arrows 70 and 72 toward filtrate outlet means 28 (FIG. 7). The retentate passes across retentate spacer 60 as shown by arrows 64 and 65, through holes 56 and to retentate outlet means 26 (FIG. 7) in a direction as shown by arrow 78. The filtrate passes into holes 28, grooves 46, outlet means 29 (FIG. 7) toward filtrate outlets 77 and 79. The retentate passes through holes 26 and to retentate outlet 81.

Figure 9:
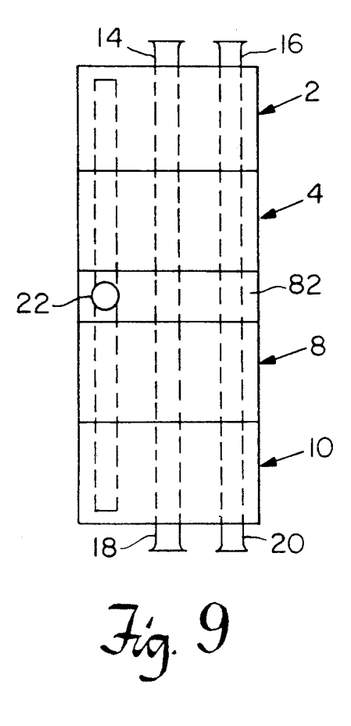
FIGS. 9 through 17 are schematic diagrams showing alternative arrangements of manifold segments and feed manifolds in accordance with this invention.
Figure 10:
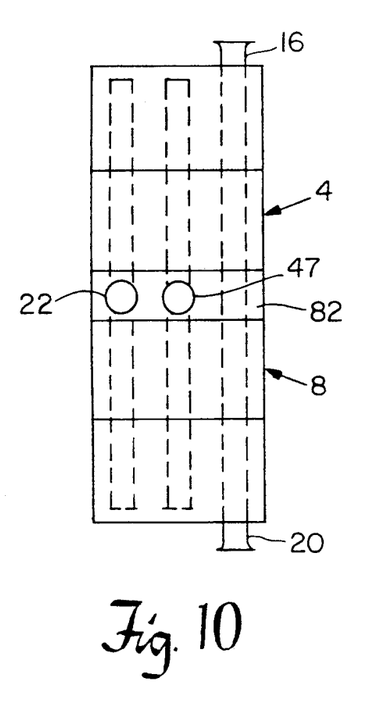
Figure 11:
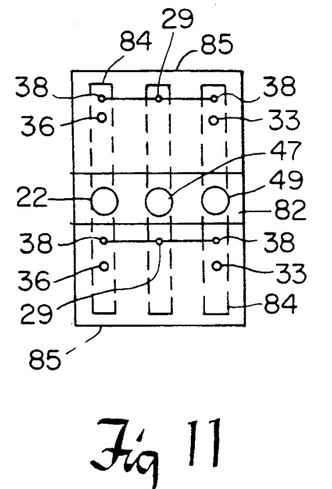
Figure 12:
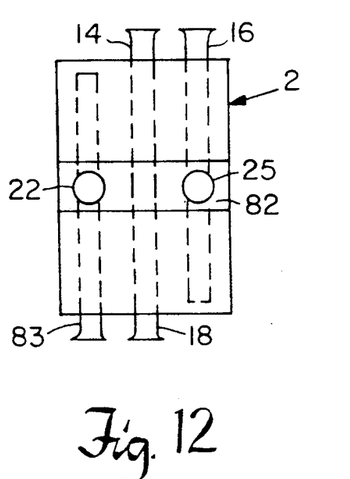
Figure 13:
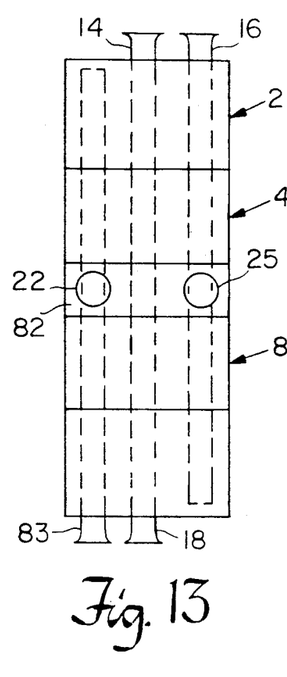
Figure 14:
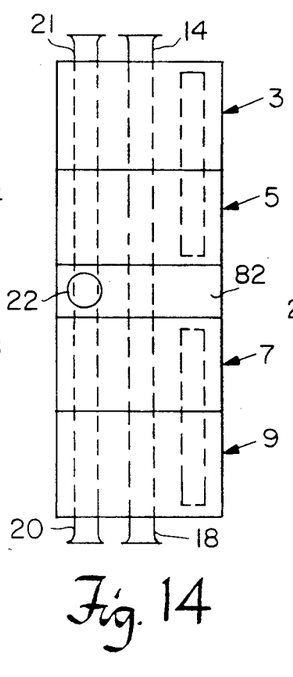
Figure 15:
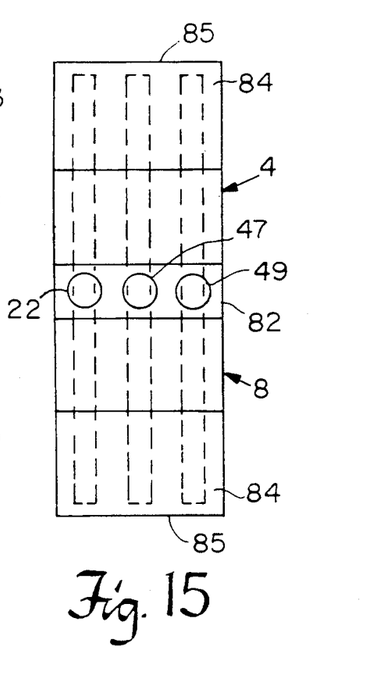
Figure 16:
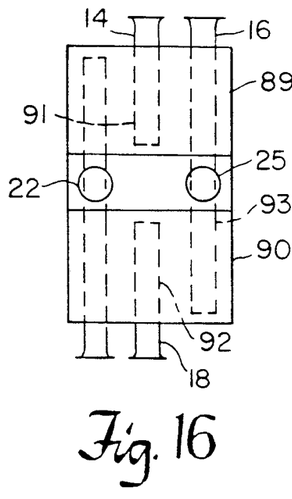
Figure 17:
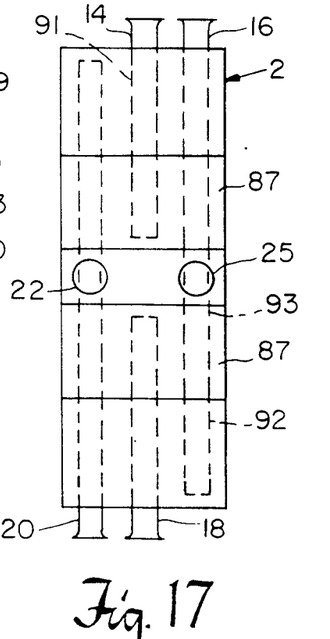

FIGS. 9 through 17 show representative manifold segment arrangements which can be utilized in the present invention. The feed manifold 82 always includes a feed inlet 22 and can include one or both of a filtrate outlet 47 and/or a retentate outlet 49. Referring to FIG. 9 liquid feed enters inlet 22, filtrate is removed from filtrate outlets 14 and 18 and retentate is removed from retentate outlets 16 and 20. Referring to FIG. 10, liquid feed enters inlet 22, filtrate is removed from filtrate outlet 47 and retentate is removed from retentate outlets 16 and 20. Referring to FIG. 11, the manifold shown utilizes end blocked manifold segments 84 which have a filtrate outlet on one surface and no outlets or inlets on opposing surface 85. Liquid feed enters inlet 22, filtrate is removed from filtrate outlet 47 and retentate is removed from retentate outlet 49. Referring to FIG. 12, liquid feed enters inlet 22, filtrate is removed from filtrate outlets 14 and 18 and retentate is removed from retentate outlet 25. Filtration is effected which retentate vent 16 and feed drain 83 are blocked. Referring to FIG. 13, liquid feed enters inlet 22, filtrate is removed from outlets 14 and 18 and retentate is removed from outlet 25. Filtration is effected when feed drain 83 and retentate vent 16 are blocked. Referring to FIG. 14, liquid feed enters inlet 22, retentate is removed from outlets 20 and 21 and filtrate is removed from outlets 14 and 18. Referring to FIG. 15, the manifold shown utilized the end blocked manifold segments 84 together with manifold segments 4 and 8. Liquid feed enters inlet 22, filtrate is removed from outlet 47 and retentate is removed from outlet 49. Referring to FIG. 16, two manifold segments 89 and 90 are provided having internal filtrate conduits 91 and 92 which do not extend into feed manifold 93 but which communicate with filtrate outlets 14 and 18 respectively. Another example of a manifold segment having an internal filtrate conduit 87 which does not directly communicate with the feed manifold is shown in FIG. 17. The manifold segments 87 include internal filtrate conduits 91 and 92 which do not extend into feed manifold 93. When a serial flow arrangement (described above) is utilized, the feed manifold of FIG. 17 also is free of an internal retentate conduit and includes a retentate outlet adjacent filtrate outlet 18 and a retentate outlet 21 adjacent filtrate outlet 14 while excluding retentate outlet 16.

I claim:
1. A manifold apparatus which comprises a first set of manifold segments, a second set of manifold segments and a feed manifold connected to and positioned between said first set of manifold segments and said second set of manifold segments,
   said first set of manifold segments being interconnected with a first internal feed conduit, a first internal retentate conduit and a first internal filtrate conduit positioned between said first internal feed conduit and said first internal retentate conduit,
   said second set of manifold segments being interconnected with a second internal feed conduit, a second internal retentate conduit and a second internal filtrate conduit positioned between said second internal feed conduit and said second internal retentate conduit,
   each of said manifold segments connected to and in fluid communication with filtration module apparatus adapted to separate a feed liquid into a retentate and a filtrate,
   said feed manifold having a third internal feed conduit connecting said first internal feed conduit and said second internal feed conduit,
   a feed inlet on said feed manifold in fluid communication with said third internal feed conduit,
   retentate removal means connected with said first internal retentate conduit and said second internal retentate conduit for removing retentate from said manifold apparatus,
   and filtrate removal means connected with said first internal filtrate conduit and said second internal filtrate conduit.

2. The apparatus of claim 1 wherein said retentate removal means is on said feed manifold.

3. The apparatus of claim 1 wherein said filtrate removal means is on said feed manifold.

4. The apparatus of claim 1 wherein said retentate removal means and said filtrate removal means are on said feed manifold.

5. The apparatus of any one of claims 1, or 3 wherein a portion of said first internal feed conduit is connected to a portion of said first internal retentate conduit and a portion of said second internal feed conduit is connected to a portion of said second retentate conduit and said retentate is removed from two ends of said manifold remote from said feed manifold.

6. The apparatus of any one of claims 1, 2, 3 or 4 wherein said first internal feed conduit is positioned in parallel to said first internal retentate conduit and said second internal feed conduit is positioned in parallel to said second internal retentate conduit.

7. The apparatus of claim 1 wherein filtrate is removed from an outlet positioned on one end of a set of said manifold segments remote from said feed manifold.

8. The apparatus of claim 1 wherein filtrate is removed each from an outlet positioned on one end of said first set of manifold segments and from an outlet positioned on one end of said second set of manifold segments remote from said feed manifold.

9. The apparatus of claim 1 wherein each said set of manifold segments is one manifold segment, and retentate and filtrate are removed from said apparatus through said feed manifold.

10. The apparatus of claim 1 wherein said feed manifold includes internal conduits consisting of an internal feed conduit and an internal retentate conduit.

11. The apparatus of claim 1 wherein said feed manifold includes an internal conduit consisting of an internal feed conduit and an internal filtrate conduit.

* * * * *